(12) United States Patent
Lyu

(10) Patent No.: US 10,764,884 B2
(45) Date of Patent: Sep. 1, 2020

(54) METHOD FOR SENDING OR RECEIVING PHYSICAL DOWNLINK CONTROL CHANNEL AND DEVICE

(71) Applicant: Huawei Technologies Co., Ltd., Shenzhen (CN)

(72) Inventor: Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/358,101

(22) Filed: Mar. 19, 2019

(65) Prior Publication Data
US 2019/0215812 A1    Jul. 11, 2019

Related U.S. Application Data

(63) Continuation of application No. PCT/CN2017/101829, filed on Sep. 15, 2017.

(30) Foreign Application Priority Data

Sep. 20, 2016    (CN) .......................... 2016 1 0834797

(51) Int. Cl.
*H04W 4/00*    (2018.01)
*H04W 72/04*    (2009.01)
(Continued)

(52) U.S. Cl.
CPC ......... *H04W 72/042* (2013.01); *H04L 5/0053* (2013.01); *H04L 5/0092* (2013.01);
(Continued)

(58) Field of Classification Search
None
See application file for complete search history.

(56) References Cited

U.S. PATENT DOCUMENTS

2011/0064042 A1    3/2011    Kim et al.
2012/0039275 A1    2/2012    Chen et al.
(Continued)

FOREIGN PATENT DOCUMENTS

CN    101682406 A    3/2010
CN    102932918 A    2/2013
(Continued)

OTHER PUBLICATIONS

Ericsson LM, et al., "Nanrowband LTE—Concept Description", 3GPP TSG RAN WG1 Meeting #82, R1-154659, Aug. 24-28, 2015, 9 pages, Beijing, China.
(Continued)

*Primary Examiner* — Phirin Sam
(74) *Attorney, Agent, or Firm* — Slater Matsil, LLP

(57) ABSTRACT

The method includes: mapping, by a network device, a first PDCCH to A control channel transmission units on a first time-frequency resource, and mapping a second PDCCH to B control channel transmission units on a second time-frequency resource, where A is a positive integer and A≥2, B is a positive integer and B≥2, a subcarrier spacing of the first time-frequency resource is a first subcarrier spacing, a subcarrier spacing of the second time-frequency resource is a second subcarrier spacing, and the first subcarrier spacing is different from the second subcarrier spacing; and sending the first PDCCH and the second PDCCH.

18 Claims, 4 Drawing Sheets

200

A network device maps a first PDCCH to A control channel transmission units on a first time-frequency resource, and the network device maps a second PDCCH to B control channel transmission units on a second time-frequency resource, where A is a positive integer and A ≥ 2, B is a positive integer and B ≥ 2, a subcarrier spacing of the first time-frequency resource is a first subcarrier spacing, a subcarrier spacing of the second time-frequency resource is a second subcarrier spacing, the first subcarrier spacing is different from the second subcarrier spacing, each control channel transmission unit includes N resource elements, the N resource elements are located in a same time domain symbol, and N is a positive integer and N ≥ 2    — S210

The network device sends the first PDCCH and the second PDCCH    — S220

(51) Int. Cl.
*H04L 27/26* (2006.01)
*H04W 72/12* (2009.01)
*H04L 5/00* (2006.01)

(52) U.S. Cl.
CPC .......... *H04L 27/26* (2013.01); *H04L 27/2602* (2013.01); *H04W 72/04* (2013.01); *H04W 72/044* (2013.01); *H04W 72/12* (2013.01); *H04W 72/1278* (2013.01)

(56) References Cited

U.S. PATENT DOCUMENTS

| | | | | |
|---|---|---|---|---|
| 2013/0036338 | A1* | 2/2013 | Kotecha | H04L 1/1812 714/748 |
| 2014/0245094 | A1* | 8/2014 | Kotecha | H04L 1/1896 714/748 |
| 2014/0341145 | A1* | 11/2014 | Nakashima | H04W 72/042 370/329 |
| 2017/0223680 | A1* | 8/2017 | Hoymann | H04W 52/0216 |
| 2017/0325075 | A1* | 11/2017 | Zou | H04W 4/06 |
| 2017/0332359 | A1* | 11/2017 | Tsai | H04B 7/0639 |
| 2018/0205523 | A1* | 7/2018 | Imamura | H04W 28/06 |

FOREIGN PATENT DOCUMENTS

| | | |
|---|---|---|
| CN | 103416015 A | 11/2013 |
| CN | 103733705 A | 4/2014 |
| CN | 105682241 A | 6/2016 |
| CN | 103858400 B | 8/2017 |
| EP | 2742754 B1 | 8/2011 |
| WO | 2016021967 A1 | 2/2016 |
| WO | 2016040290 A1 | 3/2016 |

OTHER PUBLICATIONS

Samsung, "PDCCH Design Considerations," 3GPP TSG RAN WG1#86, R1-166762, Aug. 22-26, 2016, 3 pages, Gothenburg, Sweden.

LG Electronics, "Discussions on sPDCCH for Latency Reduction," 3GPP TSG RAN WG1 Meeting #86, R1-166858, Aug. 22-26, 2016, 8 pages, Gothenburg, Sweden.

Huawei et al., "Discussion on Control Channel Design," 3GPP TSG RAN WG1 Meeting #86, R1-167203, Aug. 22-26, 2016, 5 pages, Gothenburg, Sweden.

Panasonic, "Use of Multiple Numerologies in NR," 3GPP TSG RAN WG1 Meeting #86, R1-167439, Aug. 22-26, 2016, 9 pages, Gothenburg, Sweden.

OPPO, R1-166609, Subcarrier spacing design for data and reference signal, 3GPP TSG RAN WG1 #86, 3GPP, Aug. 12, 2026, 7 pages.

* cited by examiner

200

A network device maps a first PDCCH to A control channel transmission units on a first time-frequency resource, and the network device maps a second PDCCH to B control channel transmission units on a second time-frequency resource, where A is a positive integer and $A \geq 2$, B is a positive integer and $B \geq 2$, a subcarrier spacing of the first time-frequency resource is a first subcarrier spacing, a subcarrier spacing of the second time-frequency resource is a second subcarrier spacing, the first subcarrier spacing is different from the second subcarrier spacing, each control channel transmission unit includes N resource elements, the N resource elements are located in a same time domain symbol, and N is a positive integer and $N \geq 2$ — S210

The network device sends the first PDCCH and the second PDCCH — S220

A terminal device receives, on a first time-frequency resource, a first PDCCH sent by a network device, and the terminal device receives, on a second time-frequency resource, a second PDCCH sent by the network device, where a subcarrier spacing of the first time-frequency resource is a first subcarrier spacing, a subcarrier spacing of the second time-frequency resource is a second subcarrier spacing, the first subcarrier spacing is different from the second subcarrier spacing, the first PDCCH occupies A control channel transmission units, the second PDCCH occupies B control channel transmission units, A is a positive integer and $A \geq 2$, B is a positive integer and $B \geq 2$, each control channel transmission unit includes N resource elements, the N resource elements are located in a same time domain symbol, and N is a positive integer and $N \geq 2$ — S310

The terminal device demodulates the first PDCCH and the second PDCCH — S320

FIG. 3

METHOD FOR SENDING OR RECEIVING PHYSICAL DOWNLINK CONTROL CHANNEL AND DEVICE

CROSS-REFERENCE TO RELATED APPLICATIONS

This application is a continuation of International Application No. PCT/CN2017/101829, filed on Sep. 15, 2017, which claims priority to Chinese Patent Application No. 201610834797.4, filed on Sep. 20, 2016, the disclosures of the aforementioned applications are hereby incorporated by reference in their entireties.

TECHNICAL FIELD

This application relates to the communications field, and in particular, to a method for sending or receiving a physical downlink control channel (PDCCH) and a device in the wireless communications field.

BACKGROUND

Conventional digital signal transmission is to transmit an information flow through one channel at a time, and belongs to a serial transmission mode. A multicarrier technology uses a parallel transmission mode. In this technology, serial-to-parallel conversion is performed on a high-speed serial information flow, to divide the high-speed serial information flow into a plurality of low-speed parallel information flows, and then the plurality of low-speed parallel information flows are superimposed for transmission, to form a transmission system with a plurality of carriers. For example, the multicarrier technology is a technology used for transmitting high-speed data information by using a plurality of carriers. The carrier is a radio wave that is of a specific frequency and that carries data.

The multicarrier transmission technology has been widely used in communications systems, for example, the 4th generation (4G) mobile communications system and Institute of Electrical and Electronics Engineers (IEEE) 802.11 series systems. In current communications systems, services supported by the systems are relatively unified, and each communications system supports only waveforms of one type of subcarrier spacing. In the 5th generation (5G) mobile communications system, a serving cell of a network device can support a plurality of types of subcarrier spacings, so that the serving cell can use, in different services and different deployment scenarios, different subcarrier spacing signals to serve terminal devices with different requirements.

However, how a network device schedules terminal devices that support different subcarrier spacings is an urgent problem to be resolved.

SUMMARY

This application provides a method for sending or receiving a PDCCH and a device. A network device sends PDCCHs of at least two types of different subcarrier spacings, and indicates the at least two types of subcarrier spacings in a preset manner or a manner of sending indication information, to resolve a problem about how to schedule or configure terminal devices that support different subcarrier spacings.

According to a first aspect, a method for sending a PDCCH is provided. The method includes: mapping, by a network device, a first PDCCH to A control channel transmission units on a first time-frequency resource. The method further includes mapping, by the network device, a second PDCCH to B control channel transmission units on a second time-frequency resource. A is a positive integer and $A \geq 2$, and B is a positive integer and $B \geq 2$. A subcarrier spacing of the first time-frequency resource is a first subcarrier spacing, a subcarrier spacing of the second time-frequency resource is a second subcarrier spacing, and the first subcarrier spacing is different from the second subcarrier spacing. Each control channel transmission unit includes N resource elements. The N resource elements are located in a same time domain symbol, and N is a positive integer and $N \geq 2$. The method further includes sending, by the network device, the first PDCCH and the second PDCCH.

According to the method for sending a PDCCH in this application, the network device determines at least two types of subcarrier spacings, and maps at least two PDCCHs respectively to time-frequency resources corresponding to the at least two types of subcarrier spacings, to schedule and/or configure terminal devices that support different subcarrier spacings.

Optionally, before the sending, by the network device, the first PDCCH and the second PDCCH, the method further includes: sending, by the network device, first information carried in a system message or a broadcast message. The first information is used to indicate the first subcarrier spacing and/or the second subcarrier spacing, so that a terminal device that receives the first information receives the first PDCCH based on the first subcarrier spacing or receives the second PDCCH based on the second subcarrier spacing.

The network device indicates at least one type of subcarrier spacing by sending the first information carried in the broadcast message or the system message, so that the terminal device that receives the first information determines, based on the subcarrier spacing indicated by the first information, to receive the PDCCH.

Optionally, the first information is further used to indicate locations of a frequency domain resource and a time domain resource that are occupiable by the first PDCCH and/or locations of a frequency domain resource and a time domain resource that are occupiable by the second PDCCH.

The network device indicates, by using the first information, locations of a frequency domain resource and a time domain resource that are occupiable by at least one PDCCH, to reduce calculation complexity of monitoring, by the terminal device, a PDCCH that is used to carry and schedule a common message.

Optionally, before the sending, by the network device, the first PDCCH and the second PDCCH, the method further includes: sending, by the network device, second information to the terminal device, where the second information is used to indicate the first subcarrier spacing and the second subcarrier spacing, so that the terminal device receives the first PDCCH based on the first subcarrier spacing and receives the second PDCCH based on the second subcarrier spacing.

The network device sends, to the terminal device by using higher layer signaling, the second information used to indicate the first subcarrier spacing and/or the second subcarrier spacing, and the terminal device may receive the first PDCCH based on the first subcarrier spacing and/or receive the second PDCCH based on the second subcarrier spacing, to support PDCCH sending or receiving in a communications system with a plurality of types of subcarrier spacings.

Optionally, the second information is further used to indicate locations of a frequency domain resource and a time domain resource that are occupiable by the first PDCCH and locations of a frequency domain resource and a time domain resource that are occupiable by the second PDCCH.

The network device indicates, by using the second information, locations of a frequency domain resource and a time domain resource that are occupiable by at least one PDCCH, to reduce calculation complexity of monitoring, by the terminal device, a PDCCH that is used to carry and schedule a terminal device dedicated message.

According to a second aspect, a method for receiving a PDCCH is provided. The method includes: receiving, by a terminal device on a first time-frequency resource, a first PDCCH sent by a network device. The method further includes receiving, by the terminal device on a second time-frequency resource, a second PDCCH sent by the network device. A subcarrier spacing of the first time-frequency resource is a first subcarrier spacing, a subcarrier spacing of the second time-frequency resource is a second subcarrier spacing, and the first subcarrier spacing is different from the second subcarrier spacing. The first PDCCH occupies A control channel transmission units, and the second PDCCH occupies B control channel transmission units. A is a positive integer and A≥2, and B is a positive integer and B≥2. Each control channel transmission unit includes N resource elements, the N resource elements are located in a same time domain symbol, and N is a positive integer and N≥2. The method further includes demodulating, by the terminal device, the first PDCCH and the second PDCCH.

The terminal device determines at least two types of subcarrier spacings, and receives, based on the at least two types of subcarrier spacings, at least two PDCCHs mapped to different time-frequency resources, to resolve a problem in a communications system with a plurality of subcarrier spacings about how the terminal device accesses and camps on the communications network.

Optionally, before the terminal device receives the first PDCCH and the second PDCCH, the method further includes: receiving, by the terminal device, second information sent by the network device. The second information is used to indicate the first subcarrier spacing and the second subcarrier spacing. The method further includes determining, by the terminal device, the first subcarrier spacing and the second subcarrier spacing based on the second information. The method further includes receiving the first PDCCH based on the first subcarrier spacing and receiving the second PDCCH based on the second subcarrier spacing.

The terminal device determines, based on indication information sent by the network device, subcarrier spacings of time-frequency resources that are occupiable by at least two PDCCHs, to reduce calculation complexity of monitoring, by the terminal device, a PDCCH that is used to carry and schedule terminal device dedicated information.

Optionally, the second information is further used to indicate locations of a frequency domain resource and a time domain resource that are occupiable by the first PDCCH and locations of a frequency domain resource and a time domain resource that are occupiable by the second PDCCH.

The terminal device determines, based on the indication information sent by the network device, locations of a frequency domain resource and a time domain resource that are occupiable by at least one PDCCH, to reduce calculation complexity of monitoring, by the terminal device, a PDCCH that is used to carry and schedule terminal device dedicated information.

According to a third aspect, this application provides a network device, where the network device can implement functions executed by the network device in the method in the foregoing first aspect, and the functions may be implemented by hardware, or may be implemented by executing corresponding software by hardware. The hardware or software includes one or more units or modules corresponding to the foregoing functions.

In a possible design, a structure of the network device includes a processor and a transceiver. The processor is configured to support the network device in executing a corresponding function in the foregoing method. The transceiver is configured to support communication between the network device and another device. The network device may further include a memory. The memory is coupled to the processor, and stores necessary program instructions and data of the network device.

According to a fourth aspect, this application provides a terminal device, where the terminal device can implement functions executed by the terminal device in the method in the foregoing second aspect, and the functions may be implemented by hardware, or may be implemented by executing corresponding software by hardware. The hardware or software includes one or more units or modules corresponding to the foregoing functions.

In a possible design, a structure of the terminal device includes a processor and a transceiver. The processor is configured to support the terminal device in executing a corresponding function in the foregoing method. The transceiver is configured to support communication between the terminal device and another network element. The terminal device may further include a memory. The memory is coupled to the processor, and stores necessary program instructions and data of the terminal device.

According to a fifth aspect, this application provides a communications system, and the communications system includes the terminal device in the fourth aspect and the network device in the third aspect.

According to a sixth aspect, this application provides a computer readable storage medium, where the computer readable storage medium stores computer program code, and when the computer program code is executed by a processing unit or a processor, the network device performs the method in the first aspect.

According to a seventh aspect, this application provides a computer readable storage medium, where the computer readable storage medium stores computer program code, and when the computer program code is executed by a processing unit or a processor, the terminal device performs the method in the second aspect.

According to an eighth aspect, a communications chip is provided, where the communications chip stores an instruction, and when the instruction runs on a network device, the communications chip performs the method in the first aspect.

According to a ninth aspect, a communications chip is provided, where the communications chip stores an instruction, and when the instruction runs on a terminal device, the communications chip performs the method in the second aspect.

According to a tenth aspect, a computer program product is provided, where the computer program product includes computer program code, and when the computer program code is run by a communications unit or a transceiver and a processing unit or a processor of a network device, the network device performs the method in the first aspect.

According to an eleventh aspect, a computer program product is provided, where the computer program product includes computer program code, and when the computer

BRIEF DESCRIPTION OF THE DRAWINGS

FIG. 2 is a schematic flowchart of a method for sending a PDCCH according to this application;

FIG. 3 is a schematic flowchart of a method for receiving a PDCCH according to this application;

DETAILED DESCRIPTION OF ILLUSTRATIVE EMBODIMENTS

The following describes technical solutions of this application with reference to accompanying drawings.

Technical solutions of this application may be applied to various communications systems, such as a global system for mobile communications (GSM), a Code Division Multiple Access (CDMA) system, a Wideband Code Division Multiple Access (WCDMA) system, a general packet radio service (GPRS) system, a Long Term Evolution (LTE) frequency division duplex (FDD) system, an LTE time division duplex (TDD) system, a Universal Mobile Telecommunications System (UMTS), and a 5G communications system.

In this application, a terminal device may communicate with one or more core networks through a radio access network (RAN). The terminal device may be referred to as an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communications function, a computing device, another processing device connected to a wireless modem, an in-vehicle device, a wearable device, or a terminal device in a 5G network.

In this application, a network device may be configured to communicate with a terminal device. The network device may be a base transceiver station (BTS) in GSM or CDMA, or may be a NodeB (NB) in WCDMA, or may further be an evolved NodeB (eNB) in LTE, or the network device may be a relay node, an access point, an in-vehicle device, a wearable device, a next-generation NodeB (e.g., gNB) in a 5G network, or the like. This application is not limited thereto. However, for ease of description, the following embodiments use the eNodeB eNB and the user equipment UE as examples for description.

Figure 1:
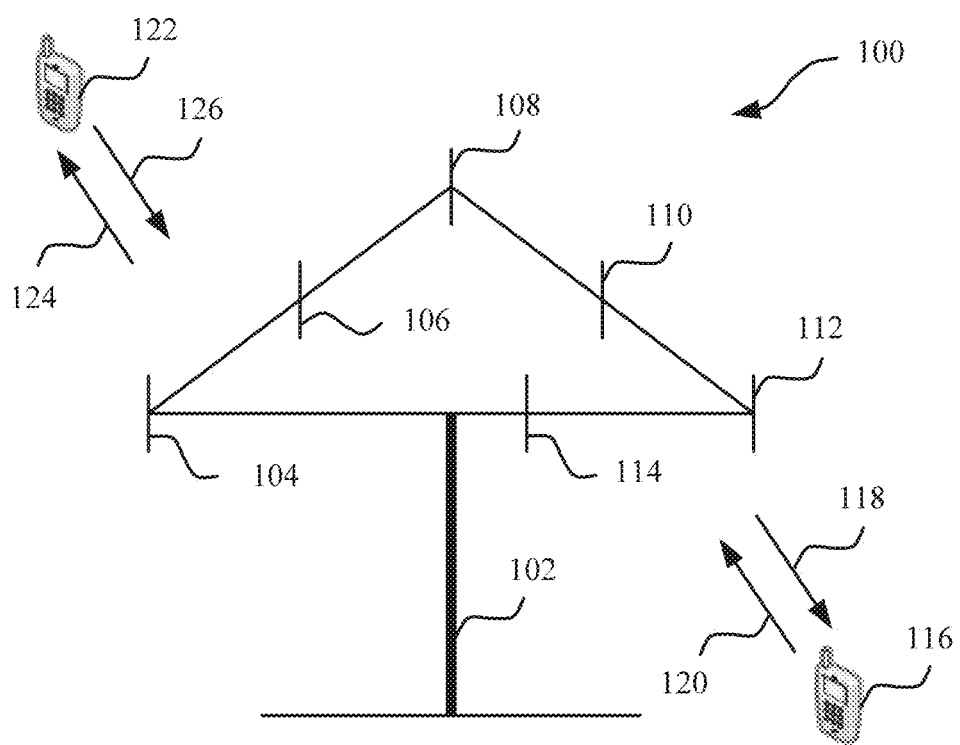
FIG. 1 is a schematic architectural diagram of a communications system, for sending or receiving a PDCCH, to which this application is applicable.

FIG. 1 is a schematic architectural diagram of a communications system 100, for sending or receiving a PDCCH, to which this application is applicable. As shown in FIG. 1, the communications system 100 may include a network device 102, the network device 102 may include one or more antenna groups, and each antenna group may include one or more antennas. For example, one antenna group may include antennas 104 and 106, another antenna group may include antennas 108 and 110, and an additional group may include antennas 112 and 114. Although two antennas are shown for each antenna group in FIG. 1, it should be understood that each antenna group may have more or fewer antennas. The network device 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, and an antenna) related to signal sending and receiving.

The network device 102 may communicate with a plurality of terminal devices (for example, a terminal device 116 and a terminal device 122). The terminal device 116 communicates with the antennas 112 and 114. The antennas 112 and 114 send information to the terminal device 116 by using a forward link 118 and receive information from the terminal device 116 by using a reverse link 120. In addition, the terminal device 122 communicates with the antennas 104 and 106. The antennas 104 and 106 send information to the terminal device 122 by using a forward link 124 and receive information from the terminal device 122 by using a reverse link 126.

For example, in a frequency division duplex system, the forward link 118 may use a frequency band different from that of the reverse link 120, and the forward link 124 may use a frequency band different from that of the reverse link 126. For another example, in a time division duplex system and a full-duplex system, the forward link 118 and the reverse link 120 may use a common frequency band, and the forward link 124 and the reverse link 126 may also use a common frequency band.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus by using a channel. The data bits may be included in a transport block (or a plurality of transport blocks) of the data, and the transport block may be segmented to generate a plurality of code blocks.

The following describes in detail a method for sending or receiving a PDCCH and a device provided in this application with reference to the accompanying drawings.

FIG. 2 is a schematic flowchart of a method 200 for sending a PDCCH according to this application. As shown in FIG. 2, the method includes the following steps.

S210: A network device maps a first PDCCH to A control channel transmission units on a first time-frequency resource. The network device maps a second PDCCH to B control channel transmission units on a second time-frequency resource. A is a positive integer and $A \geq 2$, B is a positive integer and $B \geq 2$. A subcarrier spacing of the first time-frequency resource is a first subcarrier spacing, a subcarrier spacing of the second time-frequency resource is a second subcarrier spacing, and the first subcarrier spacing is different from the second subcarrier spacing. Each control channel transmission unit includes N resource elements, the N resource elements are located in a same time domain symbol, and N is a positive integer and N≥2.

S220: The network device sends the first PDCCH and the second PDCCH.

Sending a downlink control channel by the network device may be used to schedule uplink physical layer data sending and/or downlink physical layer data receiving, or may be used to indicate uplink power control adjustment, or the like. Sending the downlink control channel may further be used to carry a random access response or schedule receiving of a random access response. In this application, the first subcarrier spacing and the second subcarrier spacing are different. The first PDCCH and the second PDCCH may carry downlink control information (DCI) in a same format. For example, the first PDCCH may carry X DCI formats, the second PDCCH may carry Y DCI formats, and X≥Y, and the X DCI formats include Y DCI formats. That DCI formats are the same may be that each type of DCI format includes a same type of indication information and the indication information includes a same quantity of information bits, or the information bits have a same coding modulation manner, to be specific, the network device generates DCI by using a same method.

The first PDCCH is mapped to the A control channel transmission units of the first time-frequency resource, the second PDCCH is mapped to the B control channel transmission units of the second time-frequency resource, A is a positive integer and A≥2, and B is a positive integer and B≥2. A and B may be equal or unequal. Each control channel transmission unit includes N resource elements, the N resource elements are located in a same time domain symbol, and N is a positive integer and N≥2. For example, a value of N may be 36, 48, 60, 72, 84, 90, 108, or 144. The resource element (RE) is a time-frequency resource that lasts for one time domain symbol in a time domain dimension and that occupies one subcarrier in a frequency domain dimension. In an example, the foregoing at least one control channel transmission unit includes both an RE carrying DCI information and an RE that is used to carry a pilot symbol and that is sent together with the RE carrying the DCI information. In another example, the at least one control channel transmission unit only includes an RE carrying DCI information.

It should be noted that the subcarrier spacing of the PDCCH in this application is a frequency domain interval between peak values of two adjacent subcarriers in subcarriers occupied by the PDCCH. When the PDCCH occupies only one subcarrier, the subcarrier spacing is a frequency domain interval between a peak value of the subcarrier occupied by the PDCCH and a peak value of an adjacent subcarrier.

The network device may determine, based on preset information stored in the network device, locations of the time-frequency resources mapped to the first PDCCH and the second PDCCH. The preset information is also stored in a terminal device, and the preset information may be specified by a standard. The network device may also determine, based on a current primary service type and a traffic volume, time-frequency resources that are occupiable by the first PDCCH and the second PDCCH, and send indication information before sending the first PDCCH and the second PDCCH, to indicate the time-frequency resources that are occupiable by the first PDCCH and the second PDCCH. In this way, a terminal device receiving the indication information monitors the first PDCCH and the second PDCCH on the time-frequency resources that are occupiable by the first PDCCH and the second PDCCH. The time-frequency resources that are occupiable by the first PDCCH and the second PDCCH may be search space of the PDCCHs, or may be time-frequency resources that are occupiable by the network device for sending the PDCCHs.

In this application, the network device may simultaneously send the first PDCCH and the second PDCCH, or may separately send the first PDCCH and the second PDCCH. The first PDCCH and the second PDCCH may be PDCCHs used to carry a random access response message, or may be PDCCHs for scheduling random access response message receiving, paging message receiving, or system information receiving, or may further be dedicated PDCCHs for scheduling downlink physical layer data receiving or uplink physical layer data sending of terminal devices. The first PDCCH and the second PDCCH may be carried on different carriers, or may be carried on a same carrier.

The foregoing embodiment is merely an example for description, and this application is not limited thereto. The network device in this application may further send more PDCCHs of different subcarrier spacings. According to the method for sending a PDCCH in this application, the network device sends PDCCHs of at least two types of subcarrier spacings, and indicates, in a preset manner or a manner of sending indication information, locations of time-frequency resources that are occupiable by the PDCCHs of the at least two types of subcarrier spacings, to schedule and/or configure terminal devices that support different subcarrier spacings.

Optionally, before the network device maps the first PDCCH and the second PDCCH respectively to the first time-frequency resource and the second time-frequency resource, the method further includes:

S230: The network device determines the first subcarrier spacing and the second subcarrier spacing from at least two types of subcarrier spacings.

The network device may determine the first subcarrier spacing and the second subcarrier spacing based on an actual situation. For example, the network device may determine the first subcarrier spacing and the second subcarrier spacing based on a carrier frequency band used by the network device, or the network device may determine the first subcarrier spacing and the second subcarrier spacing based on a capability, of a terminal device of a predetermined service, for receiving different subcarrier spacing signals.

The foregoing embodiment is merely an example for description. This application is not limited thereto. According to the method for sending a PDCCH provided in this application, the network device determines the first subcarrier spacing and the second subcarrier spacing from at least two types of subcarrier spacings based on an actual situation. This enables flexible adaptation to different application scenarios.

Optionally, before the network device sends the first PDCCH and the second PDCCH, the method 200 further includes:

S240: The network device sends first information carried in a system message or a broadcast message, where the first information is used to indicate the first subcarrier spacing and/or the second subcarrier spacing, so that the terminal device that receives the first information receives the first PDCCH based on the first subcarrier spacing or receives the second PDCCH based on the second subcarrier spacing.

In this application, the first information may indicate a subcarrier spacing of one PDCCH, or may indicate subcarrier spacings of at least two PDCCHs. When the first information indicates only the subcarrier spacing of one PDCCH, for example, when the first information indicates the subcarrier spacing of the first PDCCH (that is, the first subcarrier spacing), the network device may indicate, by using high layer signaling, the subcarrier spacing of the second PDCCH (that is, the second subcarrier spacing) to the terminal device. The first PDCCH may be a PDCCH used to carry a random access response message, or may be a PDCCH for scheduling random access response message receiving, paging message receiving, or system information receiving. The second PDCCH is a dedicated PDCCH for scheduling downlink physical layer data receiving or uplink physical layer data sending of a terminal device.

The first subcarrier spacing may be an anchor subcarrier spacing. The anchor subcarrier spacing may also be referred to as a prime subcarrier spacing or a prior subcarrier spacing. The network device may determine the anchor subcarrier spacing based on an actual situation, for example, a carrier frequency band used by the network device, or a capability, of a terminal device of a predetermined service of the network device, for receiving different subcarrier spacing signals. The anchor subcarrier spacing may be a cell-specific subcarrier spacing.

If the first information indicates at least two types of subcarrier spacings, the terminal device that receives the first information may determine one of the at least two types of subcarrier spacings as an anchor subcarrier spacing of the terminal device. The anchor subcarrier spacing may be a subcarrier spacing specific to a group of terminal devices having a same characteristic (e.g., group-specific). For example, when a plurality of terminal devices in a current cell use synchronization signals of different subcarrier spacings to access the cell, terminal devices that use synchronization signals of a same subcarrier spacing to access the cell may be considered as a group of users having a same characteristic. Using synchronization signals of a same subcarrier spacing is implementing initial access by monitoring the synchronization signals of the same subcarrier spacing. The terminal device may determine its anchor subcarrier spacing based on a subcarrier spacing of a synchronization signal used when the terminal device accesses the cell. The terminal device may use the subcarrier spacing of the synchronization signal as its anchor subcarrier spacing, or may determine the anchor subcarrier spacing according to a preset rule, where the preset rule may be stipulated by a standard. For another example, the anchor subcarrier spacing may be a terminal-device-specific (e.g., UE-specific) subcarrier spacing. If the terminal device in a current cell has preset anchor subcarrier spacing priorities, the terminal device may determine the anchor subcarrier spacing based on the preset priorities and the at least two types of subcarrier spacings indicated in the first information.

After determining the anchor subcarrier spacing, the terminal device may receive a PDCCH (for example, the first PDCCH or the second PDCCH) based on the anchor subcarrier spacing. Specifically, the terminal device may receive, by using the anchor subcarrier spacing, a PDCCH used to carry or schedule a random access response message, or may receive a PDCCH used to schedule paging message receiving, and may further receive a PDCCH used to schedule system information.

The foregoing embodiment is merely an example for description, and this application is not limited thereto. According to the method for sending a PDCCH in this application, the network device sends, by using the system message or the broadcast message, the first information used to indicate the first subcarrier spacing and/or second subcarrier spacing, and the terminal device that receives the first information may determine its anchor subcarrier spacing based on first information, and receives, based on the anchor subcarrier spacing, a PDCCH used to carry and schedule a common message, to reduce calculation complexity of monitoring, by the terminal device, a PDCCH that is used to carry and schedule a common message, and further resolve a problem about how the terminal device accesses and camps on a communications network in a communications system with a plurality of subcarrier spacing.

Optionally, in the method 200, the first information is further used to indicate locations of a frequency domain resource and a time domain resource that are occupiable by the first PDCCH and/or locations of a frequency domain resource and a time domain resource that are occupiable by the second PDCCH.

In this application, when the first information in S240 indicates the subcarrier spacing of the first PDCCH, the first information is further used to indicate the locations of the frequency domain resource and the time domain resource that are occupiable by the first PDCCH. When the first information in S240 indicates the subcarrier spacing of the first PDCCH and the subcarrier spacing of the second PDCCH, the first information is further used to indicate the locations of the frequency domain resource and the time domain resource that are occupiable by the first PDCCH and the locations of the frequency domain resource and the time domain resource that are occupiable by the second PDCCH.

The first information may indicate a bandwidth of a frequency domain resource that is occupiable by each PDCCH, for example, indicate a quantity of control channel transmission units included in the frequency domain resource. The first information may further indicate a location of a frequency domain resource that is occupiable by each PDCCH. For example, the first information may indicate a sequence number of a start subcarrier or a sequence number of a start resource block of the frequency domain resource, and the network device may further predefine several candidate frequency domain resource areas, and indicate a sequence number of a specific frequency domain resource area by using the first information.

The first information may further indicate a location of a time domain resource that is occupiable by each PDCCH. For example, the first information may indicate a quantity of time domain symbols occupied by the time domain resource and a sequence number of a start time domain symbols, and the network device may also predefine several candidate time domain resource areas, and indicate a sequence number of a specific time domain resource area by using the first information. For another example, the sequence number of a start time domain symbol of the time domain resource area is pre-agreed on by a communications standard, and the first information may indicate a sequence number of an end time domain symbol of the time domain resource.

The foregoing embodiment is merely an example for description, and this application is not limited thereto. According to the method for sending a PDCCH provided in this application, the network device indicates, by using the first information, locations of a frequency domain resource and a time domain resource that are occupiable by at least one PDCCH, to reduce calculation complexity of monitoring, by the terminal device, a PDCCH that is used to carry and schedule a common message.

Optionally, before the network device sends the first PDCCH and the second PDCCH, the method 200 further includes:

S250: The network device sends second information to a terminal device, where the second information is used to indicate the first subcarrier spacing and/or the second subcarrier spacing, so that the terminal device receives the first PDCCH based on the first subcarrier spacing and/or receives the second PDCCH based on the second subcarrier spacing.

In this application, the first PDCCH and the second PDCCH may be dedicated PDCCHs of the terminal device, and the network device sends the second information to the terminal device. The second information is used to indicate the first subcarrier spacing and/or the second subcarrier spacing, and the terminal device may receive the PDCCHs based on the first subcarrier spacing and/or the second subcarrier spacing indicated by the second information.

Optionally, the network device may reconfigure an anchor subcarrier spacing of the terminal device in the second information. The network device may determine a subcarrier spacing corresponding to a time-frequency resource with a relatively low time-frequency resource utilization rate as a new anchor subcarrier spacing of the terminal device, or may determine a subcarrier spacing corresponding to a time-frequency resource with relatively good time-frequency resource channel quality as a new anchor subcarrier spacing of the terminal device. When the second information indicates only one type of subcarrier spacing, the terminal device may also determine the one type of subcarrier spacing as a new anchor subcarrier spacing. The terminal device may monitor a common PDCCH and a user-dedicated PDCCH based on the anchor subcarrier spacing, and monitor the user-dedicated PDCCH based on other non-anchor subcarrier spacings.

The foregoing embodiment is merely an example for description, and this application is not limited thereto. According to the method for sending a PDCCH in this application, the network device sends, to the terminal device by using higher layer signaling, the second information used to indicate the first subcarrier spacing and/or the second subcarrier spacing, and the terminal device may receive the first PDCCH based on the first subcarrier spacing and/or receive the second PDCCH based on the second subcarrier spacing, to support PDCCH sending or receiving in the communications system with a plurality of types of subcarrier spacings.

Optionally, in the method 200, the second information is further used to indicate locations of a frequency domain resource and a time domain resource that are occupiable by the first PDCCH and/or locations of a frequency domain resource and a time domain resource that are occupiable by the second PDCCH.

In this application, when the second information in S250 indicates the subcarrier spacing of the first PDCCH, the second information is further used to indicate the locations of the frequency domain resource and the time domain resource that are occupiable by the first PDCCH. When the second information in S250 indicates the subcarrier spacing of the first PDCCH and the subcarrier spacing of the second PDCCH, the second information is further used to indicate the locations of the frequency domain resource and the time domain resource that are occupiable by the first PDCCH and the locations of the frequency domain resource and the time domain resource that are occupiable by the second PDCCH.

The second information may indicate a bandwidth of a frequency domain resource that is occupiable by each PDCCH, for example, indicate a quantity of control channel transmission units included in the frequency domain resource. The second information may further indicate a location of a frequency domain resource that is occupiable by each PDCCH. For example, the second information may indicate a sequence number of a start subcarrier or a sequence number of a start resource block of the frequency domain resource, and the network device may further predefine several candidate frequency domain resource areas, and indicate a sequence number of a specific frequency domain resource area by using the second information.

The second information may further indicate a location of a time domain resource that is occupiable by each PDCCH. For example, the second information may indicate a quantity of time domain symbols occupied by the time domain resource and a sequence number of a start time domain symbols, and the network device may also predefine several candidate time domain resource areas, and indicate a sequence number of a specific time domain resource area by using the second information. For another example, the sequence number of a start time domain symbol of the time domain resource area is pre-agreed on by a communications standard, and the second information may indicate a sequence number of an end time domain symbol of the time domain resource.

The foregoing embodiment is merely an example for description, and this application is not limited thereto. According to the method for sending a PDCCH provided in this application, the network device indicates, by using the second information, locations of a frequency domain resource and a time domain resource that are occupiable by at least one PDCCH, to reduce calculation complexity of monitoring, by the terminal device, a PDCCH that is used to carry and schedule a dedicated message.

According to the method for sending a PDCCH provided in this application, the network device sends PDCCHs of at least two types of different subcarrier spacings, and indicates at least one type of subcarrier spacing and locations of a frequency domain resource and a time domain resource that are occupiable by a PDCCH corresponding to the at least one type of subcarrier spacing, to support PDCCH sending or receiving in the communications system with a plurality of types of subcarrier spacings, and resolve a problem about how to schedule and/or configure terminal devices in the communications system with a plurality of subcarrier spacings.

The foregoing describes in detail the method for sending a PDCCH in this application from a perspective of the network device with reference to FIG. 2. The following describes in detail a method for receiving a PDCCH in this application from a perspective of a terminal device with reference to FIG. 3.

As shown in FIG. 3, a method 300 for receiving a PDCCH according to this application includes:

S310: A terminal device receives, on a first time-frequency resource, a first PDCCH sent by a network device, and the terminal device receives, on a second time-frequency resource, a second PDCCH sent by the network device, where a subcarrier spacing of the first time-frequency resource is a first subcarrier spacing, a subcarrier spacing of the second time-frequency resource is a second subcarrier spacing, the first subcarrier spacing is different from the second subcarrier spacing, the first PDCCH occupies A control channel transmission units, the second PDCCH occupies B control channel transmission units, A is a positive integer and A≥2, B is a positive integer and B≥2, each control channel transmission unit includes N resource elements, the N resource elements are located in a same time domain symbol, and N is a positive integer and N≥2.

S320: The terminal device demodulates the first PDCCH and the second PDCCH.

In this application, the terminal device receives at least two PDCCHs with different subcarrier spacings, for example, receives the first PDCCH on the first time-frequency resource, and receives the second PDCCH on the second time-frequency resource. The subcarrier spacing of the first time-frequency resource is different from the subcarrier spacing of the second time-frequency resource, and after receiving the first PDCCH and the second PDCCH, the terminal device demodulates the first PDCCH and the second PDCCH, to obtain corresponding DCI.

In this application, the first PDCCH and the second PDCCH may carry a same DCI format. For example, the first PDCCH may carry X DCI formats, the second PDCCH may carry Y DCI formats, and X≥Y, and the X DCI formats include the Y DCI formats. That DCI formats are the same may be that each type of DCI format includes a same type of indication information and the indication information includes a same quantity of information bits, or the information bits have a same coding modulation manner, to be specific, the network device generates DCI by using a same method.

The first PDCCH is mapped to the A control channel transmission units of the first time-frequency resource, the second PDCCH is mapped to the B control channel transmission units of the second time-frequency resource, A is a positive integer, and A≥2, and B is a positive integer and B≥2. A and B may be equal or unequal. Each control channel transmission unit includes N REs, the N REs are located in a same time domain symbol, and N is a positive integer and N≥2. For example, a value of N may be 36, 48, 60, 72, 84, 90, 108, or 144. The RE is a time-frequency resource that lasts for one time domain symbol in a time domain dimension and that occupies one subcarrier in a frequency domain dimension. In an example, the foregoing at least one control channel transmission unit includes both an RE carrying DCI information and an RE that is used to carry a pilot symbol and that is sent together with the RE carrying the DCI information. In another example, the at least one control channel transmission unit only includes the RE carrying DCI information. It should be noted that the subcarrier spacing of the PDCCH in this application is a frequency domain interval between peak values of two adjacent subcarriers in subcarriers occupied by the PDCCH. When the PDCCH occupies only one subcarrier, the subcarrier spacing is a frequency domain interval between a peak value of the subcarrier occupied by the PDCCH and a peak value of an adjacent subcarrier.

The terminal device may determine, based on preset information stored in the terminal device, locations of time-frequency resources mapped to the first PDCCH and the second PDCCH. The preset information may also be stored in the network device. The preset information may be stipulated in a standard. The terminal device may also determine, based on indication information sent by the network device, time-frequency resources that are occupiable by the first PDCCH and the second PDCCH, and monitor the first PDCCH and the second PDCCH based on the time-frequency resources. The time-frequency resources that are occupiable by the first PDCCH and the second PDCCH may be search space of the PDCCHs, or may be time-frequency resources that are occupiable by the network device for sending the PDCCHs.

In this application, the terminal device may simultaneously receive the first PDCCH and the second PDCCH, or may separately receive the first PDCCH and the second PDCCH. The first PDCCH and the second PDCCH may be PDCCHs used to carry or schedule a random access response message, or may be PDCCHs for scheduling a paging channel or scheduling system information, or may further be dedicated PDCCHs of the terminal device. The first PDCCH and the second PDCCH may be carried on different carriers, or may be carried on a same carrier.

The foregoing embodiment is merely an example for description, and this application is not limited thereto. The terminal device in this application may further receive more PDCCHs of different subcarrier spacings. According to the method for receiving a PDCCH in this application, the terminal device receives PDCCHs of at least two types of subcarrier spacings, and determines, in a preset manner or a manner of receiving indication information, locations of time-frequency resources that are occupiable by the PDCCHs of the at least two types of subcarrier spacings, to access and camp on a communications system that supports different subcarrier spacings.

Optionally, before the terminal device receives the first PDCCH and the second PDCCH, the method 300 further includes:

S330: The terminal device receives second information sent by the network device, where the second information is used to indicate the first subcarrier spacing and the second subcarrier spacing.

S340: The terminal device determines the first subcarrier spacing and the second subcarrier spacing based on the second information.

The terminal device may determine one of the first subcarrier spacing and the second subcarrier spacing as an anchor subcarrier spacing of the terminal device. The anchor subcarrier spacing may be a subcarrier spacing specific to a group of terminal devices having a same characteristic (e.g., group-specific). For example, when a plurality of terminal devices in a current cell use synchronization signals of different subcarrier spacings to access the cell, terminal devices that use synchronization signals of a same subcarrier spacing to access the cell may be considered as a group of users having a same characteristic. Using synchronization signals of a same subcarrier spacing is implementing initial access by monitoring the synchronization signals of the same subcarrier spacing. The terminal device may determine its anchor subcarrier spacing based on a subcarrier spacing of a synchronization signal used when the terminal device accesses the cell. The terminal device may use the subcarrier spacing of the synchronization signal as its anchor subcarrier spacing, or may determine the anchor subcarrier spacing according to a preset rule, where the preset rule may be stipulated by a standard. For another example, the anchor subcarrier spacing may be a terminal-device-specific (e.g., UE-specific) subcarrier spacing. If the terminal device in a current cell has preset anchor subcarrier spacing priorities, the terminal device may determine the anchor subcarrier spacing based on the preset priorities and the at least two types of subcarrier spacings indicated in the second information.

The foregoing embodiment is merely an example for description, and this application is not limited thereto. According to the method for receiving a PDCCH in this application, the terminal device determines the first subcarrier spacing and the second subcarrier spacing based on the second information carried in higher layer signaling, and receives the first PDCCH based on the first subcarrier spacing and receives the second PDCCH based on the second subcarrier spacing, to reduce calculation complexity of monitoring, by the terminal device, a PDCCH that is used to carry and schedule a dedicated message.

Optionally, the second information is further used to indicate locations of a frequency domain resource and a time domain resource that are occupiable by the first PDCCH and locations of a frequency domain resource and a time domain resource that are occupiable by the second PDCCH.

The second information may indicate a bandwidth of a frequency domain resource that is occupiable by each PDCCH, for example, indicate a quantity of control channel transmission units included in the frequency domain resource. The second information may further indicate a location of a frequency domain resource that is occupiable by each PDCCH. For example, the second information may indicate a sequence number of a start subcarrier or a sequence number of a start resource block of the frequency domain resource, and the network device may further pre-define several candidate frequency domain resource areas, and indicate a sequence number of a specific frequency domain resource area by using the second information.

The second information may further indicate a location of a time domain resource that is occupiable by each PDCCH. For example, the second information may indicate a quantity of time domain symbols occupied by the time domain resource and a sequence number of a start time domain symbols, and the network device may also predefine several candidate time domain resource areas, and indicate a sequence number of a specific time domain resource area by using the second information. For another example, the sequence number of a start time domain symbol of the time domain resource area is pre-agreed on by a communications standard, and the second information may indicate a sequence number of an end time domain symbol of the time domain resource.

The foregoing embodiment is merely an example for description, and this application is not limited thereto. According to the method for receiving a PDCCH provided in this application, the terminal device determines, by using the second information, the locations of the frequency domain resources and the time domain resources that are occupiable by the first PDCCH and the second PDCCH, to reduce calculation complexity of monitoring, by the terminal device, a PDCCH that is used to carry and schedule a dedicated message.

According to the method for receiving a PDCCH provided in this application, the terminal device determines at least two types of subcarrier spacings based on preset information or indication information sent by the network device, and receives PDCCHs that are based on the at least two types of subcarrier spacings, to resolve a problem about how to access and camp on a communications system with a plurality of subcarrier spacings.

The foregoing embodiment mainly describes the solutions of this application from a perspective of interaction between the terminal device and the network device. It may be understood that, to achieve the foregoing functions, each device includes a corresponding hardware structure and/or software module for implementing each function. A person of ordinary skill in the art should easily be aware that, in combination with units and algorithms steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, function unit division may be performed on the terminal device and the network device based on the foregoing method examples. For example, each function unit may be obtained by division based on a corresponding function, or two or more functions may be integrated into one unit. The integrated unit may be implemented in a form of hardware, or may be implemented in a form of a software functional unit. It should be noted that the unit division in this application is an example, and is merely logical function division. There may be another division manner in actual implementation.

Figure 4:
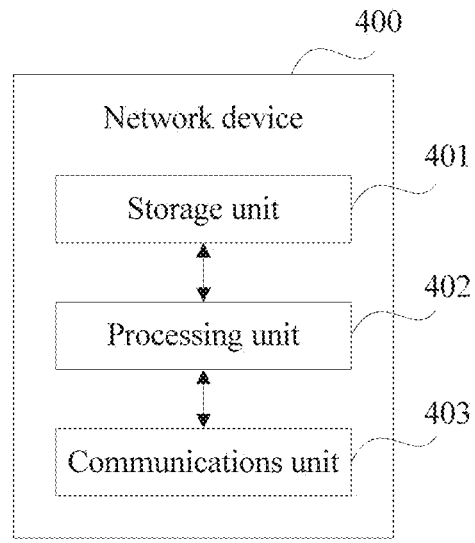
FIG. 4 is a schematic structural diagram of a possible network device according to this application.

When an integrated unit is used, FIG. 4 is a possible schematic structural diagram of the network device described in the foregoing embodiments. A network device 40000 includes a processing unit 402 and a communications unit 403. The processing unit 402 is configured to control and manage an action of the network device 400. For example, the processing unit 402 is configured to support the network device 400 in performing S210 in FIG. 2, and/or is configured to perform another process of the technology described in this specification. The communications unit 403 is configured to support communication between the network device 400 and another network entity, for example, communication with the terminal device in the method 300. The network device 400 may further include a storage unit 401, configured to store program code and data of the network device 400.

For example, the processing unit 402 is configured to map a first physical downlink control channel PDCCH to A control channel transmission units on a first time-frequency resource, and the processing unit is configured to map a second PDCCH to B control channel transmission units on a second time-frequency resource, where A is a positive integer and A≥2, B is a positive integer and B≥2, a subcarrier spacing of the first time-frequency resource is a first subcarrier spacing, a subcarrier spacing of the second time-frequency resource is a second subcarrier spacing, the first subcarrier spacing is different from the second subcarrier spacing, each control channel transmission unit includes N resource elements, the N resource elements are located in a same time domain symbol, and N is a positive integer and N≥2; and the communications unit 403 is configured to send the first PDCCH and the second PDCCH that are mapped by the processing unit 402 to the control channel transmission units.

The processing unit 402 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications unit 403 may be a transceiver or a transceiver circuit. The storage unit 401 may be a memory.

Figure 5:
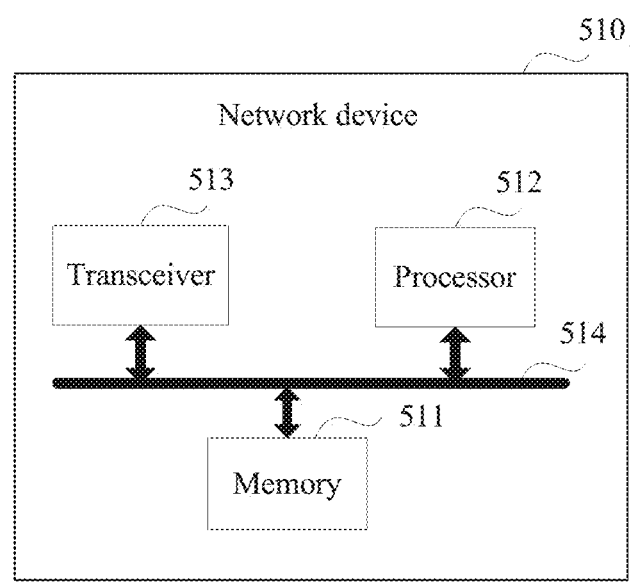
FIG. 5 is a schematic structural diagram of another possible network device according to this application.

When the processing unit 402 is a processor, the communications unit 403 is a transceiver, and the storage unit 401 is a memory, the network device in this application may be a network device shown in FIG. 5.

As shown in FIG. 5, the network device 510 includes a processor 512, a transceiver 513, and a memory 511. The transceiver 513, the processor 512, and the memory 511 may communicate with each other by using an internal connection channel, and transmit a control signal and/or a data signal.

It may be clearly understood by a person skilled in the art that, for the purpose of convenient and brief description, for a detailed working process of the foregoing apparatus and unit, refer to a corresponding process in the foregoing method embodiments, and details are not described herein again.

Therefore, the network device provided in this application sends PDCCHs of at least two types of different subcarrier spacings, and indicates at least one type of subcarrier spacing and locations of a frequency domain resource and a time domain resource that are occupiable by a PDCCH corresponding to the at least one type of subcarrier spacing, to support PDCCH transmission in a communications system with a plurality of types of subcarrier spacings, and resolve a problem about how to schedule and/or configure terminal devices in the communications system with a plurality of subcarrier spacings.

Figure 6:
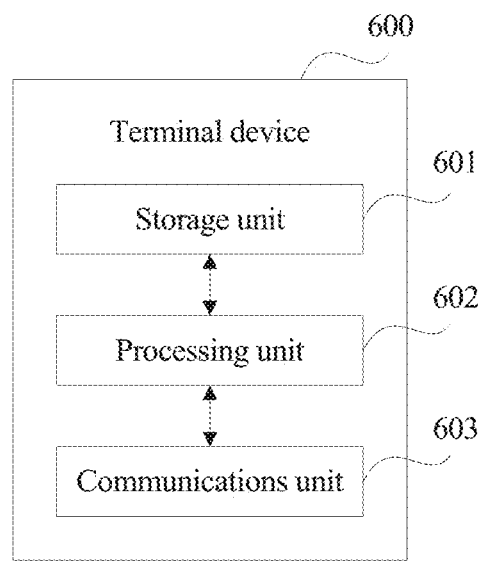
FIG. 6 is a schematic structural diagram of a possible terminal device according to this application.

When an integrated unit is used, FIG. 6 is a possible schematic structural diagram of the terminal device described in the foregoing embodiments. A terminal device 600 includes a processing unit 602 and a communications unit 603. The processing unit 602 is configured to control and manage an action of the terminal device 600. For example, the processing unit 602 is configured to support the terminal device 600 in performing S310 in FIG. 3, and/or is configured to perform another process of the technology described in this specification. The communications unit 603 is configured to support communication between the terminal device 600 and another network entity, for example, communication with the network device in the method 200. The terminal device 600 may further include a storage unit 601, configured to store program code and data of the terminal device 600.

For example, the communications unit 6o3 is configured to receive, on a first time-frequency resource, a first PDCCH sent by a network device, and the communications unit 6o3 is configured to receive, on a second time-frequency resource, a second PDCCH sent by the network device, where a subcarrier spacing of the first time-frequency resource is a first subcarrier spacing, a subcarrier spacing of the second time-frequency resource is a second subcarrier spacing, the first subcarrier spacing is different from the second subcarrier spacing, the first PDCCH occupies A control channel transmission units, the second PDCCH occupies B control channel transmission units, A is a positive integer and A≥2, B is a positive integer and B≥2, each control channel transmission unit includes N resource elements, the N resource elements are located in a same time domain symbol, and N is a positive integer and N≥2; and the processing unit 602 is configured to demodulate the first PDCCH and the second PDCCH that are received by the communications unit 603.

The processing unit 602 may be a processor or a controller, for example, may be a CPU, a general-purpose processor, a DSP, an ASIC, an FPGA, or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communications unit 6o3 may be a transceiver or a transceiver circuit. The storage unit 601 may be a memory.

Figure 7:
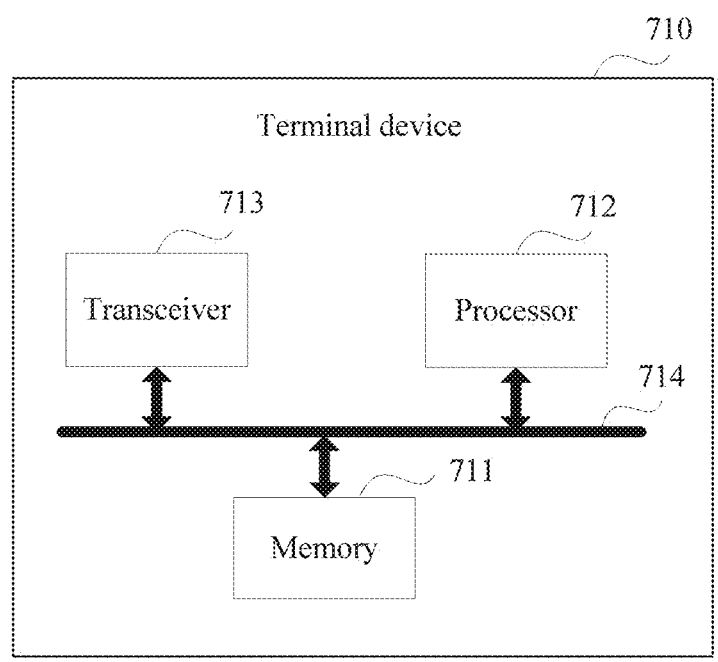
FIG. 7 is a schematic structural diagram of another possible terminal device according to this application.

When the processing unit 602 is a processor, the communications unit 603 is a transceiver, and the storage unit 601 is a memory, the terminal device in this application may be a terminal device shown in FIG. 7.

As shown in FIG. 7, the terminal device 710 includes a processor 712, a transceiver 713, and a memory 711. The transceiver 713, the processor 712, and the memory 711 may communicate with each other by using an internal connection channel, and transmit a control signal and/or a data signal.

It may be clearly understood by a person skilled in the art that, for the purpose of convenient and brief description, for a detailed working process of the foregoing apparatus and unit, refer to a corresponding process in the foregoing method embodiments, and details are not described herein again.

Therefore, the terminal device provided in this application determines at least two types of subcarrier spacings based on preset information or indication information sent by the network device, and receives PDCCHs that are based on the at least two types of subcarrier spacings, to resolve a problem about how to access and camp on a communications system with a plurality of subcarrier spacings.

In this application, sequence numbers of processes do not mean execution sequences. The execution sequences of the processes should be determined based on functions and internal logic of the processes, and should not constitute any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in a terminal device or a network device as discrete components.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from one website site, computer, server or data center to another website site, computer, server, or data center in a wired (for example, coaxial cable, optical fiber, or digital subscriber line (DSL)) or a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made within the spirit and principle of the present invention shall fall within the protection scope of this application.

What is claimed is:

1. A method, comprising:
mapping, by a network device, a first physical downlink control channel (PDCCH) to A control channel transmission units on a first time-frequency resource, wherein A is a positive integer and A≥2, and a subcarrier spacing of each subcarrier of the first time-frequency resource is a first subcarrier spacing;
mapping a second PDCCH to B control channel transmission units on a second time-frequency resource, wherein B is a positive integer and B≥2, a subcarrier spacing of each subcarrier of the second time-frequency resource is a second subcarrier spacing, the first subcarrier spacing is narrower or wider than the second subcarrier spacing, each control channel transmission unit of the A control channel transmission units and the B control channel transmission units comprises N resource elements, the N resource elements are located in a same time domain symbol, and N is a positive integer and N≥2; and
sending, by the network device, the first PDCCH and the second PDCCH.

2. The method according to claim 1, wherein before the network device maps the first PDCCH and the second PDCCH, respectively, to the first time-frequency resource and the second time-frequency resource, the method further comprises:
determining the first subcarrier spacing and the second subcarrier spacing from at least two types of subcarrier spacings.

3. The method according to claim 1, wherein before sending the first PDCCH and the second PDCCH, the method further comprises:
sending first information carried in a system message or a broadcast message, wherein the first information indicates the first subcarrier spacing or the second subcarrier spacing.

4. The method according to claim 3, wherein:
the first information further indicates a first frequency domain resource and a first time domain resource are occupiable by the first PDCCH; or
the first information further indicates a second frequency domain resource and a second time domain resource are occupiable by the second PDCCH.

5. The method according to claim 1, wherein before sending the first PDCCH and the second PDCCH, the method further comprises:
sending second information to a terminal device, wherein the second information indicates the first subcarrier spacing and the second subcarrier spacing.

6. The method according to claim 5, wherein the second information further indicates:
a first frequency domain resource and a first time domain resource that are occupiable by the first PDCCH; and
a second frequency domain resource and a second time domain resource that are occupiable by the second PDCCH.

7. A method, comprising:
receiving, by a terminal device on a first time-frequency resource, a first physical downlink control channel (PDCCH) from a network device, wherein a subcarrier spacing of each subcarrier of the first time-frequency resource is a first subcarrier spacing, the first PDCCH occupies A control channel transmission units, and A is a positive integer and A≥2;
receiving, by the terminal device on a second time-frequency resource, a second PDCCH from the network device, wherein a subcarrier spacing of each subcarrier of the second time-frequency resource is a second subcarrier spacing, the first subcarrier spacing is narrower or wider than the second subcarrier spacing, the second PDCCH occupies B control channel transmission units, B is a positive integer and B≥2, each control channel transmission unit of the A control channel transmission units and the B control channel transmission units comprises N resource elements, the N resource elements are located in a same time domain symbol, and N is a positive integer and N≥2; and
demodulating the first PDCCH and the second PDCCH.

8. The method according to claim 7, wherein before the terminal device receives the first PDCCH and the second PDCCH, the method further comprises:
receiving second information from the network device, wherein the second information indicates the first subcarrier spacing and the second subcarrier spacing; and
determining the first subcarrier spacing and the second subcarrier spacing according to the second information.

9. The method according to claim 8, wherein the second information further indicates:
a first frequency domain resource and a first time domain resource that are occupiable by the first PDCCH; and
a second frequency domain resource and a second time domain resource that are occupiable by the second PDCCH.

10. An apparatus, comprising:
a transceiver;
a non-transitory memory storage comprising instructions; and
one or more hardware processors in communication with the non-transitory memory storage, wherein the one or more hardware processors execute the instructions to:
map a first physical downlink control channel (PDCCH) to A control channel transmission units on a first time-frequency resource, wherein A is a positive integer and A≥2, and a subcarrier spacing of each subcarrier of the first time-frequency resource is a first subcarrier spacing;

map a second PDCCH to B control channel transmission units on a second time-frequency resource, wherein B is a positive integer and B≥2, a subcarrier spacing of each subcarrier of the second time-frequency resource is a second subcarrier spacing, the first subcarrier spacing is narrower or wider than the second subcarrier spacing, each control channel transmission unit of the A control channel transmission units and the B control channel transmission units comprises N resource elements, the N resource elements are located in a same time domain symbol, and N is a positive integer and N≥2; and send the first PDCCH and the second PDCCH.

11. The apparatus according to claim 10, wherein the one or more hardware processors further execute the instructions to determine the first subcarrier spacing and the second subcarrier spacing from at least two types of subcarrier spacings.

12. The apparatus according to claim 10, wherein the one or more hardware processors further execute the instructions to send first information carried in a system message or a broadcast message, wherein the first information indicates the first subcarrier spacing or the second subcarrier spacing.

13. The apparatus according to claim 12, wherein the first information further indicates:
a first frequency domain resource and a first time domain resource that are occupiable by the first PDCCH; or
a second frequency domain resource and a second time domain resource that are occupiable by the second PDCCH.

14. The apparatus according to claim 10, wherein the one or more hardware processors further execute the instructions to send second information to a terminal device, wherein the second information indicates the first subcarrier spacing and the second subcarrier spacing.

15. The apparatus according to claim 14, wherein the second information further indicates:
a first frequency domain resource and a first time domain resource that are occupiable by the first PDCCH; and
a second frequency domain resource and a second time domain resource that are occupiable by the second PDCCH.

16. An apparatus, comprising:
a transceiver;
a non-transitory memory storage comprising instructions; and
one or more hardware processors in communication with the non-transitory memory storage, wherein the one or more hardware processors execute the instructions to:
receive, on a first time-frequency resource, a first physical downlink control channel (PDCCH) from a network device, wherein a subcarrier spacing of each subcarrier of the first time-frequency resource is a first subcarrier spacing, the first PDCCH occupies A control channel transmission units, and A is a positive integer and A≥2;
receive, on a second time-frequency resource, a second PDCCH from the network device, wherein a subcarrier spacing of each subcarrier of the second time-frequency resource is a second subcarrier spacing, the first subcarrier spacing is narrower or wider than the second subcarrier spacing, the second PDCCH occupies B control channel transmission units, B is a positive integer and B≥2, each control channel transmission unit of the A control channel transmission units and the B control channel transmission units comprises N resource elements, the N resource elements are located in a same time domain symbol, and N is a positive integer and N≥2; and
demodulate the first PDCCH and the second PDCCH.

17. The apparatus according to claim 16, wherein one or more hardware processors further execute the instructions to:
receive second information from the network device, wherein the second information indicates the first subcarrier spacing and the second subcarrier spacing; and
determine the first subcarrier spacing and the second subcarrier spacing according to the second information.

18. The apparatus according to claim 17, wherein the second information further indicates a first frequency domain resource and a first time domain resource that are occupiable by the first PDCCH and a second frequency domain resource and a second time domain resource that are occupiable by the second PDCCH.

* * * * *